April 21, 1959 — J. T. POPE — 2,882,941
APPARATUS FOR FELLING TREES AND PRODUCING LOGS FROM THE TRUNKS
Filed Jan. 29, 1957 — 7 Sheets-Sheet 2
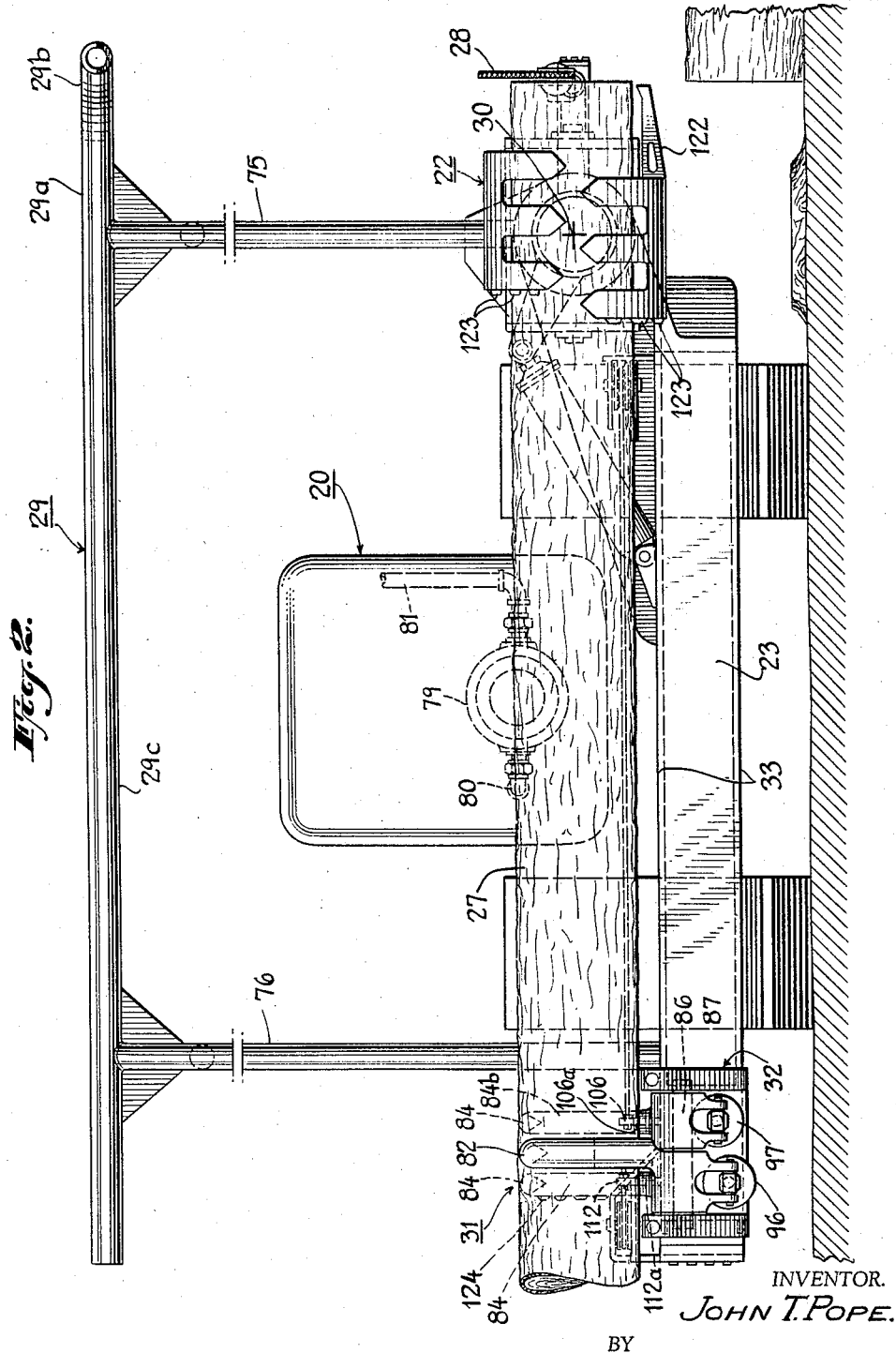
INVENTOR.
JOHN T. POPE.
BY
*Ward, Neal, Haselton Orme & McElhannon*
ATTORNEYS.

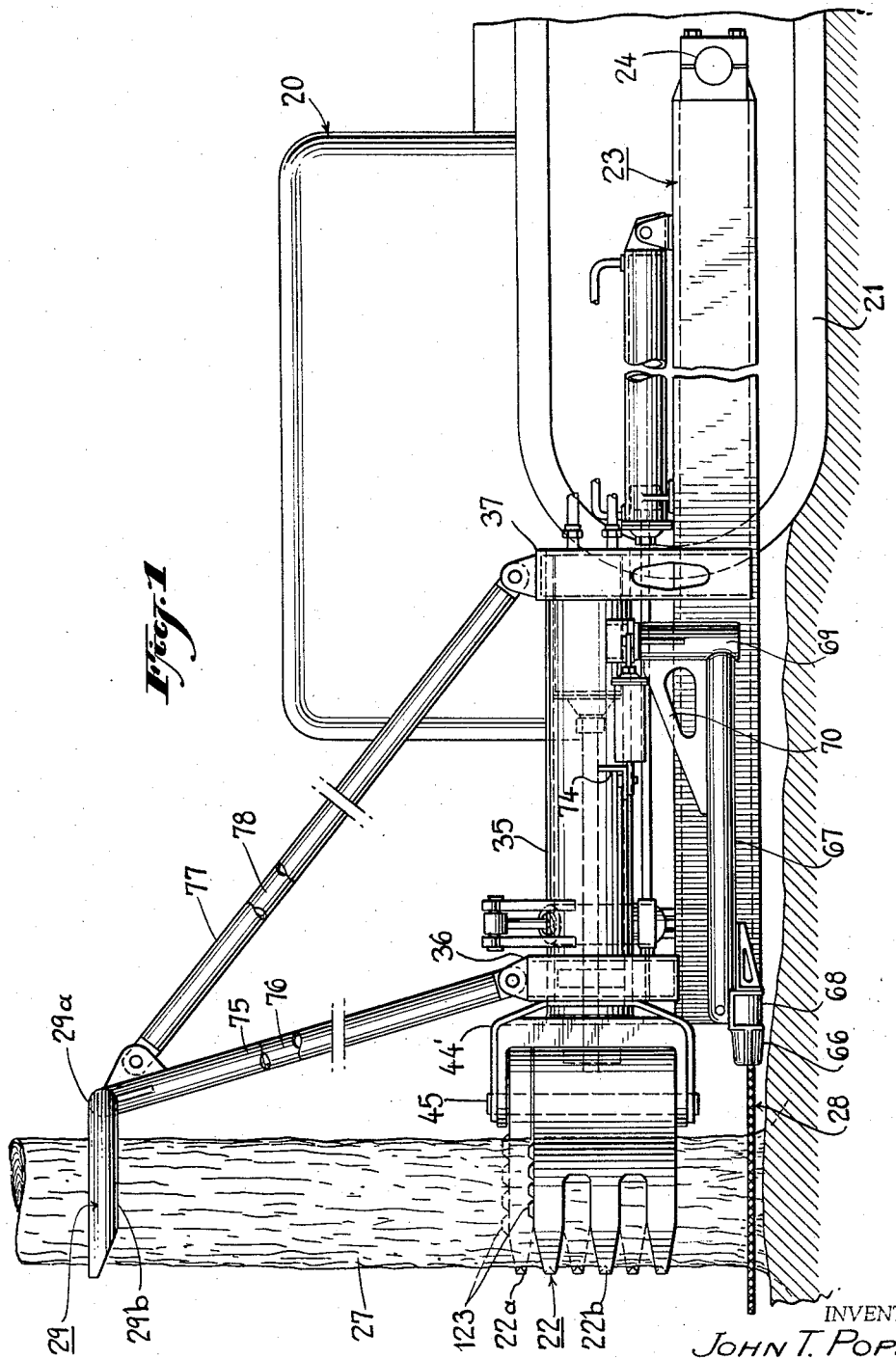

April 21, 1959          J. T. POPE          2,882,941
APPARATUS FOR FELLING TREES AND PRODUCING LOGS FROM THE TRUNKS
Filed Jan. 29, 1957          7 Sheets-Sheet 3
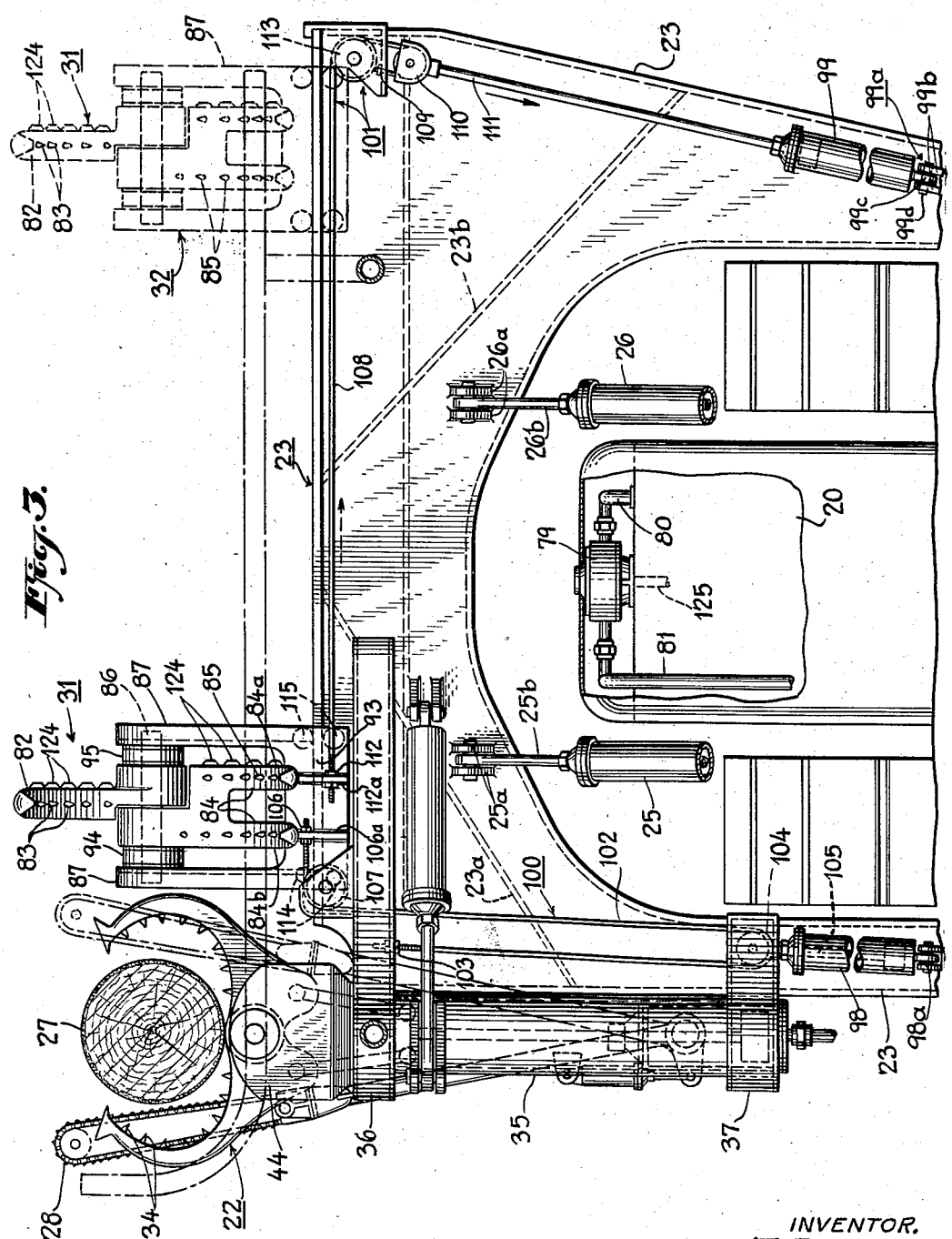
INVENTOR.
JOHN T. POPE.
ATTORNEYS.

April 21, 1959 J. T. POPE 2,882,941
APPARATUS FOR FELLING TREES AND PRODUCING LOGS FROM THE TRUNKS
Filed Jan. 29, 1957 7 Sheets-Sheet 4
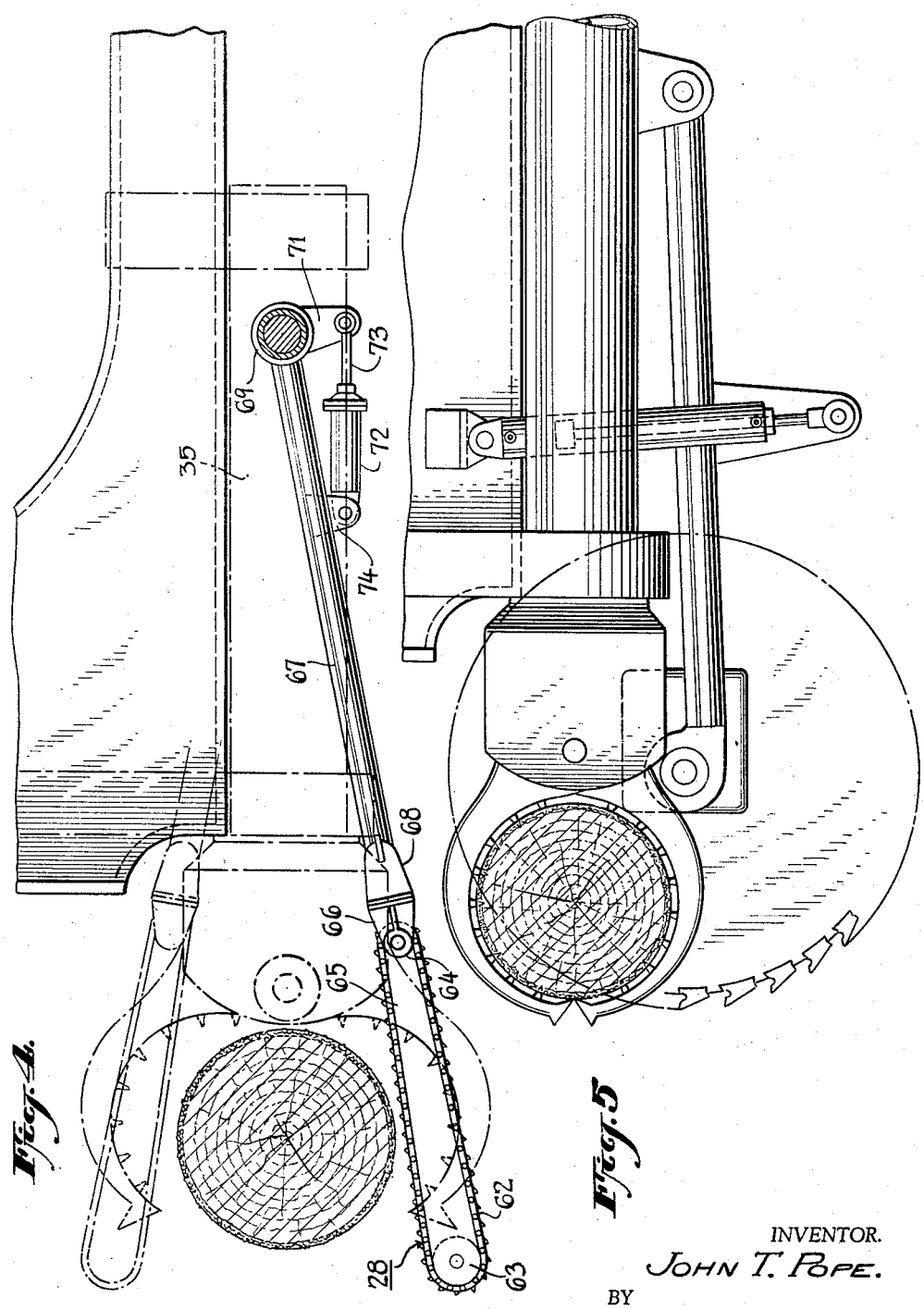
INVENTOR.
JOHN T. POPE.
BY
Ward Neal Haselton Orme & McElhannon
ATTORNEYS.

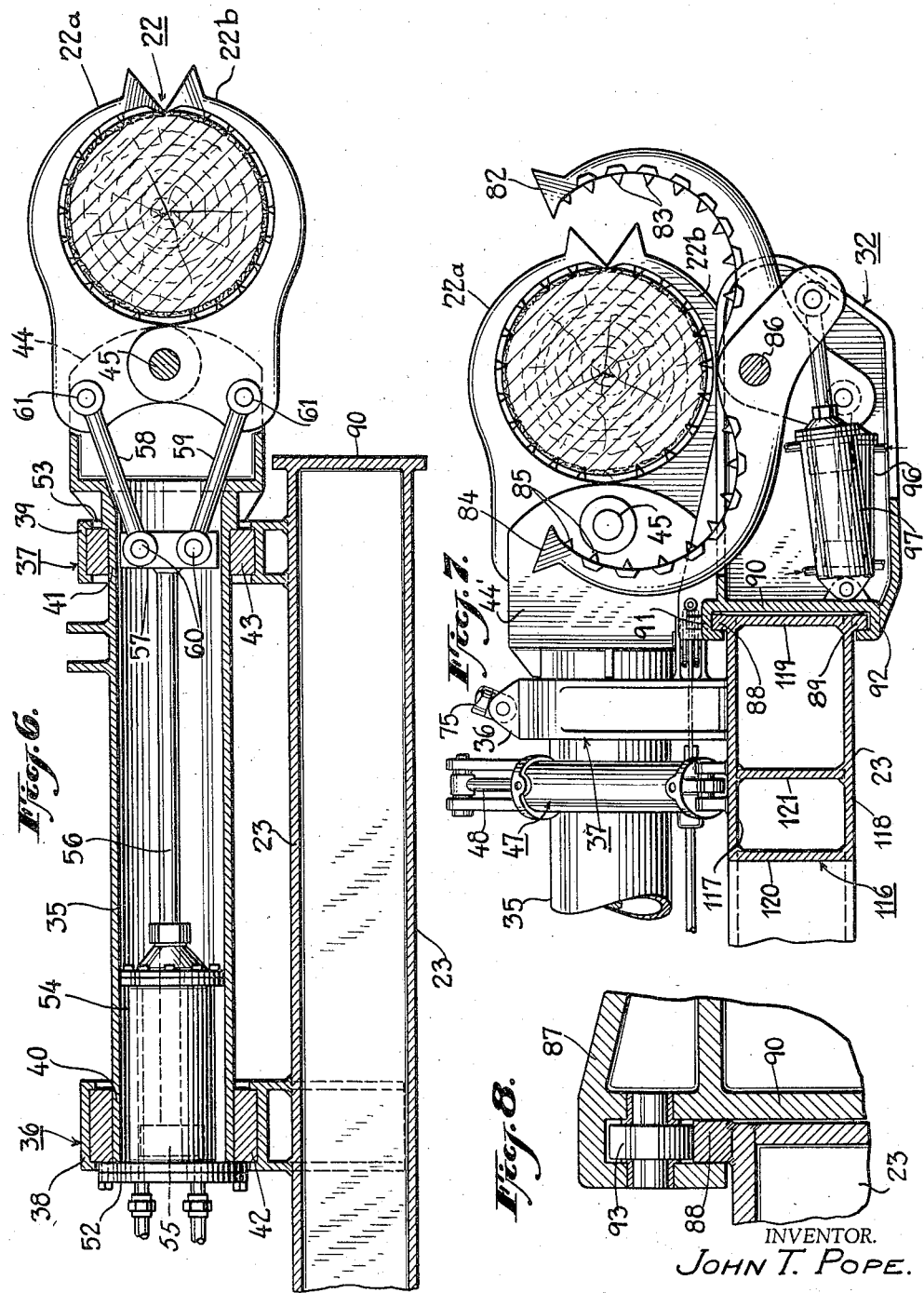

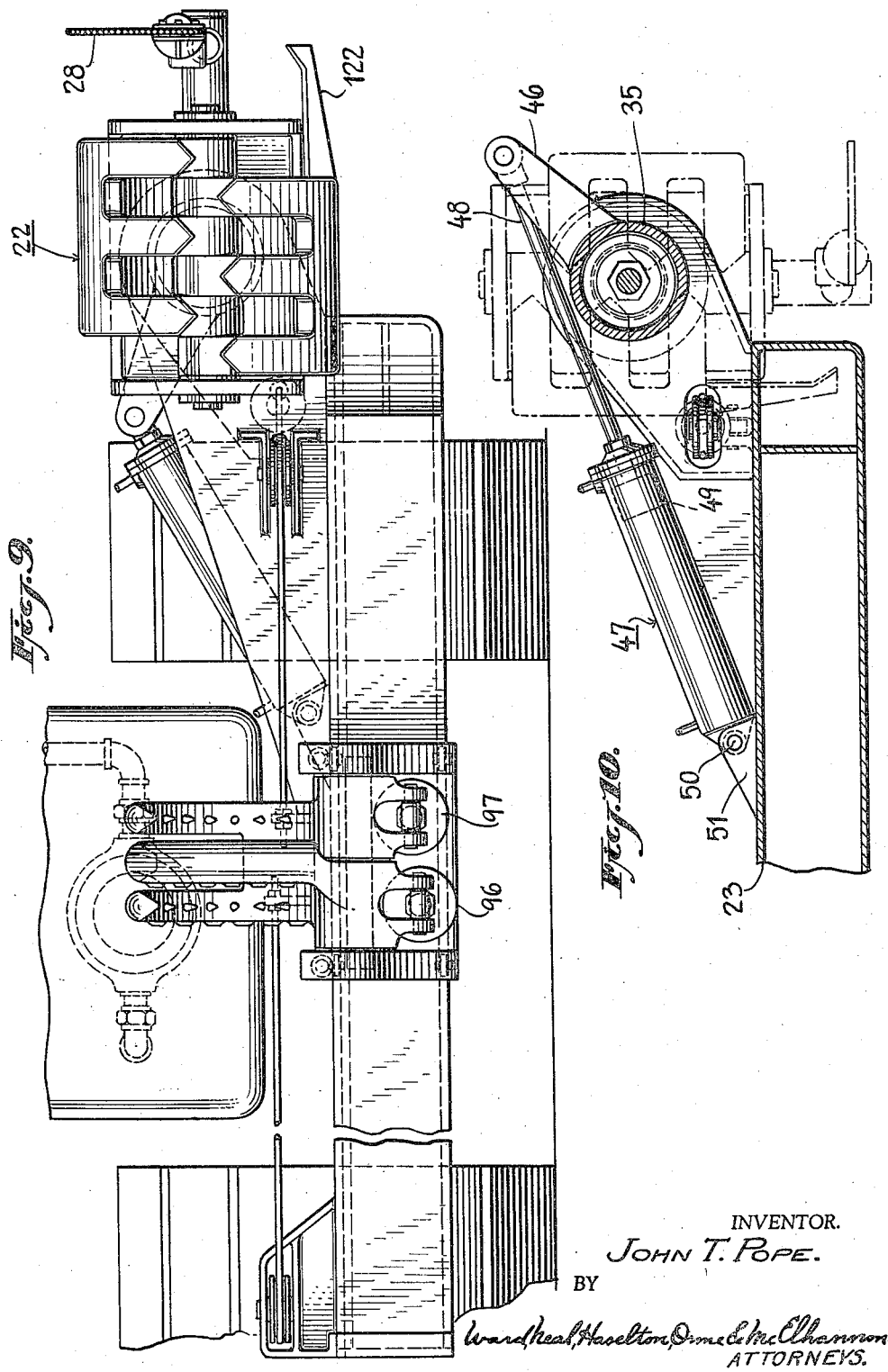

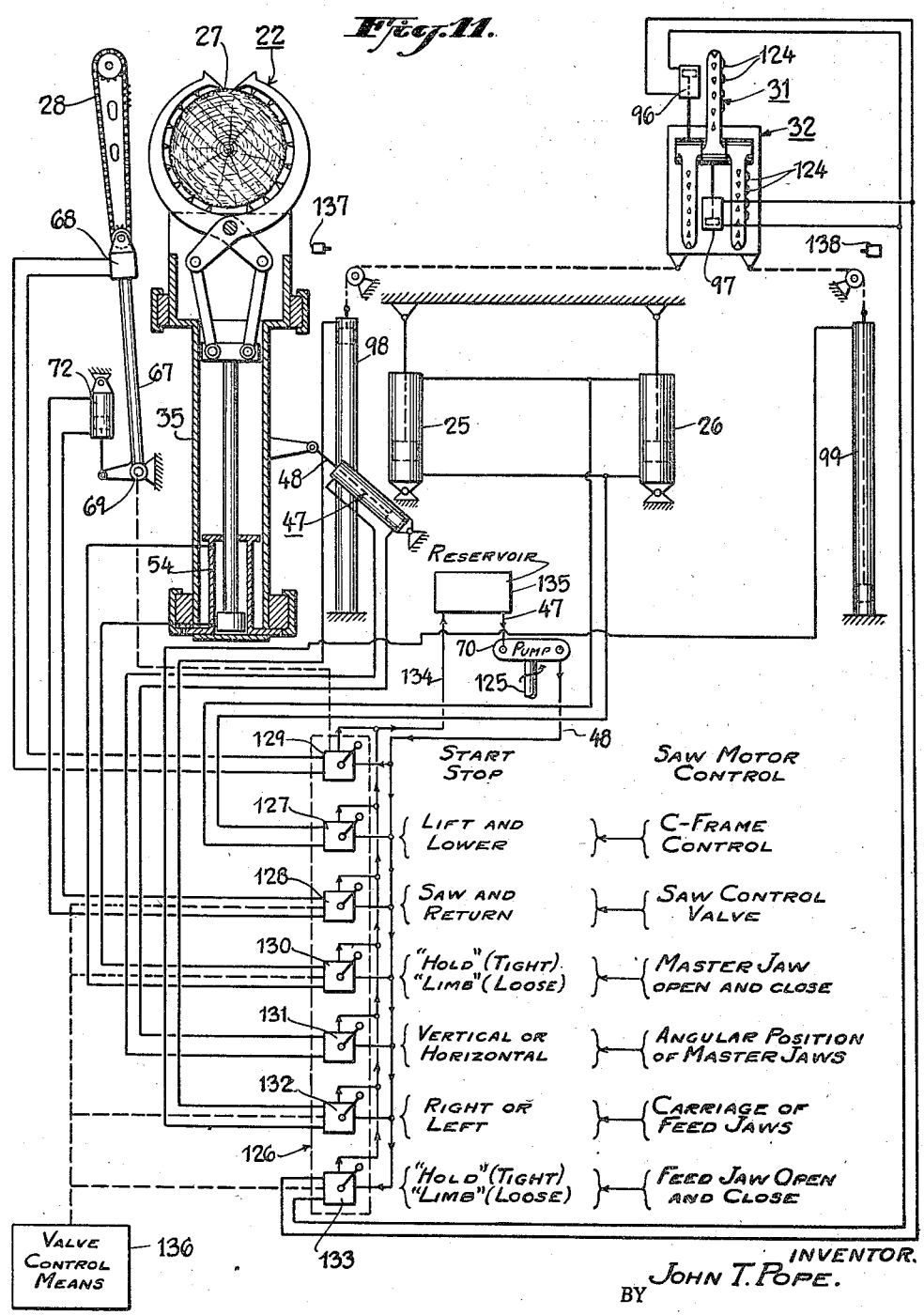

United States Patent Office 2,882,941
Patented Apr. 21, 1959

2,882,941

APPARATUS FOR FELLING TREES AND PRODUCING LOGS FROM THE TRUNKS

John T. Pope, Hay River, Canada, assignor, by mesne assignments, to St. Regis Paper Company, New York, N.Y., a corporation of New York Application January 29, 1957, Serial No. 636,921

15 Claims. (Cl. 143—43)

This invention relates to tree cutting apparatus, and more particularly to apparatus for clamping the base of a tree trunk, cutting through the tree trunk below the clamping means and swinging the tree trunk downward to a horizontal poistion while under control of the clamping means, thereafter gripping the tree trunk by other clamping means which in coaction with the first-mentioned clamping means can advance the trunk longitudinally for cutting same into pulpwood lengths.

The apparatus, in a preferred form thereof, comprises devices for accomplishing the above functions and which may be mounted upon a mobile vehicle, such as a tractor of the crawler type, the latter comprising a part of the overall combination. Such apparatus thus includes primary clamping means, sometimes referred to as a pair of master jaws, for clamping the base of a tree trunk. Such master jaws are mounted in such a way that they can be positioned for grasping a substantially vertical tree trunk and, after the latter has been severed by saw means, can shift angularly about a substantially horizontal axis thereby swinging down to a horizontal position the trunk of the tree while maintaining same under control. Suitable power means are provided for so angularly shifting the pair of master jaws. Power saw means are mounted upon the vehicle, preferably upon the mounting means for the pair of master jaws, such saw means being positioned for sawing through the tree trunk in a substantially horizontal plane close to the base of the tree when the master jaws clamp the tree in its upright position. The power saw means are angularly shiftable in response to the aforementioned angular shifting of the pair of master jaws about such substantially horizontal axis thereby to position such saw means for cutting the felled tree into selected lengths, for example, for making pulpwood. Such horizontal axis of movement of the pair of master jaws thus is substantially perpendicular to the tree trunk grasped thereby.

A secondary clamping means for the tree trunk is also mounted upon the vehicle, and is sometimes referred to as a pair of feed jaws, and further is positioned for receiving the tree trunk after it has been so felled and thus is in a horizontal position. The two pairs of jaws preferably are mounted upon a frame member which is attached to the vehicle, such frame being referred to as a C-frame because of its configuration, and alternatively being referred to as a U-frame, the opposite legs of the U being pivotally attached to the vehicle on opposite sides thereof and the base thereof preferably being in front of the vehicle.

Power means for raising and lowering such C-frame are provided particularly for exerting a lifting force upon the pair of master jaws when the latter are clamped tightly upon a tree trunk and the power saw is cutting therethrough thereby to prevent binding of the saw by the weight of the tree. Means are further provided for mounting the two pairs of jaws (master and feed) for movement relative to one another, for example, the pair of feed jaws in the form shown are mounted upon a carriage which is shiftable along the front of the C-frame. When the master jaws are in their horizontal position the two pairs of jaws are coaxial and thus are mounted for relative movement along such common axis. Suitable power means are provided for effecting this relative movement. Thus by tightly clamping the trunk with the feed jaws and loosely clamping same with the master jaws, the tree trunk can be axially shifted in response to moving the feed jaws toward the master jaws, thereby to move selected lengths of the tree trunk past the saw whereby selected lengths may be cut off. Serrations or cutters are provided upon the inner surfaces of both pairs of jaws whereby a forceful scraping or debarking action can be exerted upon the tree trunk in response to tightly gripping the trunk with one pair of jaws and urging the latter axially through the other pair of jaws which relatively less tightly engage such trunk. Means can be provided automatically for effecting the above sequence of events by automatic control of the devices for accomplishing same.

One of the objects of the present invention is to provide an apparatus of this type which can rapidly fell trees under controlled conditions not heretofore attained.

A further object is to provide an apparatus of this type which can sever a tree and by virtue of its grip thereupon and its mobility can transfer same while in an upright position to a selected location for felling.

Another object is to provide a novel apparatus for debarking and delimbing trees which have been so felled.

Still a further object is to provide novel apparatus for felling, debarking and delimbing trees and feeding same in selected lengths to a sawing device, the tree trunk at all times being under the control of the operator of the apparatus and without touching the tree trunk to the ground.

The above and further objects and novel features of this invention will more fully appear from the detailed description given below when the same is read in connection with the accompanying drawings. It is to be expressly understood, however, that the drawings are for purposes of illustration only and are not intended as a definition of the limits of the invention, reference for this latter purpose being had to the appended claims.

In the drawings:

Fig. 1 is a side elevation of one form of apparatus embodying the present invention;

Fig. 2 is a front elevation of the apparatus shown in Fig. 1 but in a different operating position;

Fig. 3 is a top plan view, partly in section and with parts broken away, of the apparatus as shown in Figs. 1 and 2;

Fig. 4 is a fragmentary top plan view, partly in section and with parts broken away, and upon an enlarged scale relative to Fig. 3, showing in greater detail the master jaws and power saw means;

Fig. 5 is a fragmentary plan view, also partly in section and with parts broken away, of an alternative power saw means (circular saw) which may be employed with the master jaws shown in Fig. 4;

Fig. 6 is a top plan view, partly in section and with parts broken away, upon a relatively enlarged scale, showing additional details of the pair of master jaws and the control means therefor;

Fig. 7 is a fragmentary side elevation of both the master jaws and the feed jaws shown in Fig. 2, as viewed from the lefthand extremity of the latter figure, the view being partly in section and with parts broken away and illustrating in particular the means for opening and closing the latter pair of jaws and the means for mounting same;

Fig. 8 is a fragmentary view on an enlarged scale, also partly in section and with parts broken away, showing a portion of the bearing means for a movable carriage which supports said feed jaws;

Fig. 9 is a front elevation of the apparatus showing certain of the parts already shown in Fig. 2 but in a different operating position, and further illustrating certain details of the means for mounting and moving the feed jaws;

Fig. 10 is a view, partly in section and with parts broken away, of a portion of the apparatus as shown in Fig. 9 but in a different operating position, that is, with the master jaws thereof shown in their vertical position for grasping an upright tree trunk; and Fig. 11 is a schematic view of one form of hydraulic circuit which may be employed for interconnecting the various hydraulically actuated elements of the apparatus and further illustrating schematically such elements.

Referring to the drawings in greater detail with particular reference to Figs. 1 and 2, the novel apparatus is constituted by suitable attachments to accomplish the above-mentioned results, such attachments being adapted for mounting upon a self-powered mobile vehicle, such as a tractor, preferably of the crawler type. Thus the invention in one form thereof comprises in combination with a mobile vehicle, such as a crawler tractor 20 having crawler treads 21, a pair of master jaws 22 which are mounted by suitable mounting means, to appear more fully below, upon a C-frame 23 mounted by means of trunnions 24 upon opposite sides of such vehicle. As viewed in Fig. 3, power lifting means comprising hydraulic power cylinders 25 and 26 are provided for raising and lowering the C-frame 23, particularly for the purpose of exerting a lifting force upon a tree trunk 27 (Fig. 1) gripped by the pair of master jaws 22 while the trunk is being sawed through at the base thereby to prevent the weight of the tree from binding the saw.

Referring again to Fig. 3, the aforementioned power cylinders 25 and 26, for raising and lowering the C-frame 23, are pivotally secured to the C-frame by anchor lugs 25a and 26a, respectively, which are secured to the C-frame and pivotally associated with piston rods 25b and 26b of the power cylinders 25 and 26, respectively.

A power saw 28 is provided which is positioned for sawing through the base of the tree trunk well below the master jaws 22, as will appear more fully hereinafter, the location of the cut being as close to the ground as possible.

For the purpose of protecting the operator of the tractor 20, a guard rail 29 (Fig. 1) is mounted thereupon, preferably upon the C-frame, by means also to be more fully explained below, the coaction of the closed master jaws 22 and the guard rail 29 preventing the tree from falling upon the vehicle.

Referring now to Fig. 2, it will be noted that the tree trunk 27 has been angularly shiftable from an upright to a horizontal position about a substantially horizontal axis perpendicular thereto, as indicated at 30, and comprising the horizontal axis of the mounting means for the master jaws 22. There is further provided another pair of jaws 31 for receiving the felled tree trunk, as is well illustrated in Fig. 2, which jaws are mounted upon a carriage 32, the latter in turn being movable upon carriage track means 33 to be described more fully below. By tightly gripping the tree trunk 27 by the feed jaws 31 and relatively loosely gripping same by the master jaws 22, it will be seen that moving the carriage 32, by suitable power means, will urge the tree trunk axially to the right, as viewed in Fig. 2, and thus in selected lengths past the power saw 28, the latter having shifted angularly to a position for effecting a cut in a vertical plane as a result of the angular shifting of the master jaws 22. Such axial shifting of the trunk 27 also causes a debarking and delimbing of the trunk by virtue of serrations or cutters 34 (Fig. 3) formed on the gripping surfaces of such master jaws.

Reverting now to Figs. 1, 3 and 6, the mounting means for the master jaws 22 and for the power saw 28 will now be described. Such mounting means comprises a tubular shaft 35 which is angularly shiftable about a substantially horizontal axis by virtue of bearing means 36 and 37 at opposite extremities thereof, such bearing means being suitably mounted upon the aforementioned C-frame 23, as is well shown in Fig. 6. Such bearing means, for example, includes outer bearing surfaces 38 and 39 respectively of the bearing means 36 and 37, and inner bearing surfaces 40 and 41 respectively of the same bearing means. There may be interposed between such surfaces suitable roller bearings, such as 42 and 43, also respectively of the bearing means 36 and 37.

To the tubular shaft 35 there is rigidly secured a master jaw housing 44 (Fig. 1) which mounts a master jaw pivot pin 45 which comprises the pivot shaft for the two separate master jaws 22a and 22b.

The means for angularly shifting the master jaws 22 from their vertical to their horizontal positions (as shown respectively in Figs. 1 and 2) is shown in Fig. 10 comprising a tubular shaft control arm 46 which is rigidly secured to the tubular shaft 35 and is operatively connected to a tubular shaft turning or power cylinder 47 by means of a ram or piston rod 48, one end of which, of course, is pivotally connected to the outer extremity of the arm 46 and the other extremity of which is connected to a power cylinder piston 49 which operates in a well known manner. The lower extremity of the power cylinder 47 (Fig. 10) is pivotally secured to the C-frame 23 by means of a pivot pin 50 which interconnects a pair of C-frame adapter lugs 51 with such lower extremity of the power cylinder 47.

Referring again to Fig. 6, a tubular shaft retainer plate 52 is secured to the lefthand extremity thereof, as viewed in this figure, for holding same against axial movement in cooperation with a suitable shoulder 53 formed at the opposite extremity of the tubular shaft, such retainer plate 52 and shoulder 53 in turn cooperating with portions of the bearing means 36 and 37 which are secured to the C-frame 23.

The master jaws 22a and 22b are opened and closed by means of a master jaw power control cylinder 54 having a piston 55 and a piston rod or ram 56 connected thereto which interconnects such piston to a master jaw guide link 57, the latter in turn being connected respectively to the jaws 22a and 22b by means of master jaw control links 58 and 59, such links, of course, being pivotally associated with such master jaw guide link and their respective master jaws. Master jaw control link pins 60 pivotally associate the elements 57, 58 and 59 and control link pins 61 pivotally associate said elements (links) 58 and 59 with their respective master jaws 22a and 22b.

The master jaws 22a and 22b (Fig. 2) each comprise, in a desired form thereof, trifurcated elements, each thus having three teeth, the trifurcated portions being staggered, as is well shown in Fig. 1, the teeth being tapered at their ends whereby the jaws can close tightly upon a relatively small tree trunk. Thus the jaws, although able to close to form a substantial circle in the manner well shown in Figs. 5–7, are capable of closure to a greater extent than that shown for the purpose as aforementioned of grasping tree trunks of a diameter smaller than that shown in these figures.

Referring now to Figs. 1 and 4, there will now be described the operative interconnection between the power saw 28 and the remainder of the apparatus. The saw 28 is of the endless chain variety comprising articulated serrated links in an endless band 62 which, in a well known manner, pass about front and rear pulleys 63 and 64 which are mounted upon a saw guide 65. The latter in turn is supported by a gear case 66 rigidly attached to a saw control arm 67, the latter having mounted thereupon an hydraulic motor 68 which provides power to the chain saw and thus transfers torque via the gears within the gear case 66 to the pulley 64 and thence to the chain saw.

The saw control arm 67 is mounted for angular movement in such a manner that it will provide a cut in a horizontal plane when the master jaws 22 are in the attitude of Fig. 1, that is, in a vertical attitude for clamping an upright tree trunk 27. The mounting for the saw, however, is designed for shifting angularly with the master jaws 22 for the purpose of shifting the position of the saw 28 so that it will saw in a substantially vertical plane responsive to the "swinging down" or angular shifting of the master jaws 22 and tree 27 to a horizontal position. Thus the saw 28 is adapted for performing the dual function of first sawing through the tree trunk at its base to permit the felling of the tree, and thereafter for sawing through the felled tree trunk at desired locations to provide selected lengths, the tree trunk being feedable to the saw by means to appear more fully hereinafter.

Consequently the aforementioned saw control arm 67 is secured to the tubular shaft 35 for angular movement therewith, the interconnection between such two elements 67 and 35, in the form shown, being via a saw offset sleeve bearing 69 (Figs. 1 and 4) which at its lower extremity mounts the saw control arm 67 and at its upper extremity is pivotally secured, as aforementioned, to the tubular shaft 35. A fillet or gusset 70 is provided for reinforcing in a well known manner the interconnection between the elements 67 and 69.

The means for controlling the angular movement of the saw 28 relative to the tubular shaft 35 and thence relative to the master jaws 22 includes, as is well shown in Fig. 4, a saw swing control arm 71 which is rigidly secured to the upper extremity (Fig. 1) of the saw offset sleeve bearing 69 and which is pivotally associated in a well known manner with a saw arm power or control cylinder 72 having a piston rod 73 which is pivotally connected to the outer extremity of the arm 71, the rear extremity (Fig. 4) of the cylinder 72 being pivotally mounted by a mounting lug 74 which is secured to the aforementioned tubular shaft 35.

Referring again to Fig. 1 and to the saw offset sleeve bearing 69, the pivot means for supporting the latter element are preferably integral with the tubular shaft 35 and hence as the latter shaft changes its position angularly about its horizontal axis the saw follows a like angular change.

The guard rail 29 (Figs. 1 and 2) is mounted in a position of selected elevation for the purpose of protecting the vehicle 20 and its operator. The guard rail 29, as viewed in plan (not shown), preferably is provided with a crook or elbow at 29a (Fig. 1) which in effect divides the guard rail into a relatively short arm portion 29b and a considerably longer portion 29c (Fig. 2).

Near each extremity of the guard rail 29 are the left and right front supporting arms 75 and 76, respectively (as viewed from the operator's position on the vehicle 20). Such left and right supporting arms are in turn held in position by left and right rear supporting arms 77 and 78, respectively (Fig. 1), which are secured as there shown, the lower extremities of said rear supporting arms 77 and 78 being anchored by suitable means to the C-frame 23, the lower extremities of the front support arms being also anchored to the C-frame.

Referring to Fig. 3, I have found it desirable to reinforce the C-frame 23 by left and right reinforcing plates 23a and 23b, respectively, which are secured to this structure in the manner shown.

The hydraulic power means aforementioned include the hydraulic power cylinders above described and further include the hydraulic motor 68 to receive fluid under pressure in a manner to be described further hereinafter via a valve construction from a high capacity hydraulic pump 79 (Fig. 3) having intake and outlet conduits 80 and 81, respectively.

Referring now particularly to Figs. 2, 3 and 6–9 inclusive, there will now be described the aforementioned secondary tree trunk clamping means or feed jaws 31, together with the means for mounting same upon the apparatus and for moving same relative to the master jaws 22.

The feed jaws 31 comprise a single jaw 82 having serrations 83 upon its inner surface, such single serrated feed jaw being the outermost one, as viewed in Figs. 3 and 7. The feed jaws 31 also include a double feed jaw 84 including feed jaws 84a and 84b which are also provided with serrations, as at 85, such serrations 83 and 85 coacting for debarking or delimbing, as will appear hereinafter. The feed jaws 82 and 84 are in staggered arrangement, as is well illustrated in Fig. 2, and thus adapted for grasping and holding tree trunks of smaller and also larger diameter than that shown in cross-section in the drawings.

The feed jaws 31, including 82 and 84, are pivotally mounted upon a feed jaw shaft 86 (Fig. 3) which in turn is supported upon opposed parallel arms 87 of carriage 33. As aforementioned, the feed jaws 31 are mounted for movement relative to the master jaws 22, this being achieved by associating the feed jaw carriage 32 in a movable manner with the C-frame 23. This is accomplished by forming the forward portion of the C-frame 23 with suitable carriage track and guide means designated 33 above and in detail comprising an upper carriage track 88 (Fig. 7) and lower carriage track 89 which are secured to and may be integral with the forward portion of the C-frame 23. The carriage 32 is associated with the tracks 88 and 89 in the manner well shown in Figs. 7 and 8 by means including a flanged plate 90 having formed at the opposite extremities thereof U-shaped flanges 91 and 92 which fit around the upper and lower tracks 88 and 89, respectively.

Suitable roller bearing means are provided for supporting the feed jaw carriage 32 upon the tracks 88 and 89, a fragment of which bearing means is shown in Fig. 8 and comprising a roller 93 which is rotatably mounted upon the carriage 32 and positioned for resting upon the upper horizontal surface of the track 88, there being analogous rollers along the bottom of the carriage 32 for engaging track 89. Any desired number of such rollers 93 may be provided. Suitable spacer washers 94 and 95 are positioned, as shown in Fig. 3, for spacing the feed jaws from the arms 87.

The individual feed jaws 82, 84 of the pair 31 are provided respectively with power cylinders 96, 97 (Figs. 2 and 7) which are coordinated in such a fashion that the jaws can be easily opened and closed by hydraulic pressure applied to these cylinders in a well known manner.

The means for moving the feed jaw carriage 32 back and forth across the guide means therefor will now be described with particular reference to Fig. 3, such means including a pair of carriage control cylinders 98 and 99 respectively on the left and righthand side of the apparatus and operatively interconnected to the carriage 32 by means of a pair of cable and sheave devices 100 and 101, respectively. The cable and sheave arrangement 100 includes a cable or wire rope 102 which is anchored at one extremity 103 thereof to C-frame 23 and which passes around a pulley 104 secured to a piston rod 105 of the power cylinder 98, such cable 102 thence passing to the carriage 32 and there being anchored at 106, the cable 102 passing around corner pulley 107 which is rotatably mounted upon a fixed pivot on the C-frame 23. The cable and sheave arrangement 101 comprises an analogous construction and includes a cable 108 which at extremity 109 also is anchored to the C-frame 23 and from which it passes around a pulley 110 secured to a movable piston 111 of the power cylinder 99 from which it passes to a cable anchor point 112 upon the carriage 32 via a pulley 113 which is rotatably mounted on a fixed pivot also upon the C-frame 23. The lengths of the cable and of the piston rods aforementioned are coordinated to produce the desired right and left movement in response to the application of fluid under pressure to the power cylinders 98, 99, in a well known manner.

The extremities 106 and 112, as aforementioned, are anchored to the feed jaw carriage 87. This is accomplished in a manner well illustrated in Figs. 2 and 3 wherein the cable extremities are anchored respectively to lugs or gussets 106a and 112a which are rigidly secured to said carriage 87.

The power cylinders 98 and 99 are secured to the C-frame 23 in the manner shown in Fig. 3 by pivotal connections 98a and 99a at the rear extremity respectively of each power cylinder. Such pivotal connections are identical and are typified by connection 99a comprising two lugs 99b rigidly secured to the C-frame 93 and a lug 99c secured to the rear extremity of the power cylinder 99 and interposed between the pair of lugs 99b and pivotally connected thereto by means of a horizontal pivot pin 99d.

The means for associating the feed jaw carriage 32 with its carriage track and guide means was partially described above, including the roller means 93 of Fig. 8, it there being explained that such roller means 93 are employed for engaging both the top and bottom rails 88 and 89 along the horizontal surfaces thereof. In addition to such vertical rollers 93, suitable horizontal rollers are employed, for example, four pairs thereof, one pair for each of the four corners of the rear carriage plate 90. Two pairs 114, 115 of such horizontal rollers are shown in Fig. 3. Each pair of such rollers are rotatably mounted upon the carriage 32 and spaced properly for engaging opposite vertical faces of either rail 88 or 89. Thus in the form shown a total of six pairs of such rollers are employed for associating the feed jaw carriage 32 with its guide means, namely, four pairs of horizontal rollers, such as 114 and 115, and two pairs of vertical rollers, one of such rollers 93 being shown in detail as above described in Fig. 8.

I have found it advantageous, in one form of the invention, to design the supporting means for the feed jaw carriage 32 to permit a movement thereof along its guide means to the extent of about 100 inches.

Referring again to Fig. 7, the forward portion of the C-frame 23 is shown in cross-section illustrating a desired construction, such section being of rectangular configuration and designated by the numeral 116 having upper and lower horizontal plates 117 and 118, respectively, and front and rear vertical plates 119 and 120, such plates being, for example, welded to the upper and lower plates in a well known manner. If desired, a reinforcing vertical plate 121 may be secured to such upper and lower plates intermediate such vertical plates.

For purposes of facilitating the sawing of the tree trunk into selected lengths, a timber brace 122 (Fig. 2) may be secured to the lowermost of the jaws 22, as viewed in such figure, such timber brace extending to the right to a location just short of the plane of the cut of the saw 28.

Cutter means or serrations 34 have been described above located on the inner surfaces of the master jaws 22 for the purpose of aiding in gripping a tree trunk, such cutter means or serrations also being adapted for debarking or delimbing the tree trunk when the latter is moved axially in the master jaws, the latter at that time gripping the tree trunk in a relatively loose grip but sufficiently closely engaged thereto for the debarking or delimbing function. In addition to the serrations or cutters 34 formed on the inner surfaces of the master jaws 22 there are provided, as shown in Figs. 1 and 2, axially extending cutters or serrations 123 positioned upon the upper surfaces of the master jaws, as viewed in Fig. 1, and the lefthand surfaces thereof as viewed in Fig. 2, it being apparent that the sliding of the tree trunk or axially shifting of same to the right (Fig. 2) relative to the master jaws 22 will bring the limbs or branches into engagement with the serrations 123 for severing same. Such elements 123 are also referred to as master jaw limb cutters.

Analogous cutters 124 (Fig. 3) are provided upon the surfaces of the feed jaws 31 which face to the right, as viewed in Fig. 3, although, if desired, such cutters 124 may be placed upon the opposite surfaces of the feed jaws. In the position of such cutters 124, as shown in the drawings, it will be noted that by gripping the tree trunk 27 tightly by the master jaws 22 and moving the feed jaws 31 to the left (Fig. 2) (from a position close to the master jaws), will delimb the portion of the tree trunk traversed by such feed jaws.

Reverting to Fig. 3, the pump 79 is powered by the engine of the vehicle 20 by means of an interconnection with a suitable "power takeoff" shaft 125 suitably connected to such engine.

Referring now to the hydraulic circuit shown schematically in Fig. 11, there will be briefly described one manner of operatively interconnecting the various fluid-actuated power means above mentioned with a multi-valve control panel 126 located in a place convenient to the operator of the vehicle 20. The multi-valve control panel 126 includes the following seven manually operable valves:

(a) C-frame control valve 127 for raising and lowering the C-frame 23 by means of power cylinders 25, 26;

(b) Saw control valve 128 for actuating the power means 72 to control the angular position of the saw 28 about the axis of the pivot element 69;

(c) Saw motor control valve 129 for starting and stopping the hydraulic motor 68 for the saw 28;

(d) Master jaw control valve 130 for controlling the master jaw power cylinder 54;

(e) Master jaw vertical-horizontal control valve 131;

(f) Feed jaw carriage control valve 132 for controlling the right and left movement of the carriage 32; and (g) Feed jaw open and close control valve 133.

The manually operable valves 127–133, inclusive, receive fluid under pressure from the pump 79 via the aforementioned outlet conduit 48 and direct same in a well known manner to their respective fluid actuated devices via suitable conduits connected thereto, as shown in Fig. 11, each of said valves 127–133 having a suitable exhaust in communication with a common exhaust conduit 134 which is in connection with a fluid reservoir 135, the latter feeding fluid via the inlet conduit 47 to the pump 79.

In operation, the tree cutting procedure is initiated by opening the master jaws 22 and placing same in a vertical position adapted for grasping the base of an upright tree trunk. Thus the master jaw control valve 130 is actuated manually to open the main jaws 22 and the main jaw vertical-horizontal control valve 131 is adjusted to position the main jaws in such vertical position. The operator now moves the vehicle or tractor to the tree site. It is, of course, understood that the saw 28 is positioned by means of the saw control valve 128 in its initial location, namely, to the left of the main jaws 22 as viewed in Fig. 11. When the tree trunk is within the open main jaws 22, the valve 130 is actuated to close same thereby to hold tightly with maximum available force the trunk of the tree. The valve 130 may be adjusted either to "open" or "closed" position. When in a closed position the valve can be adjusted either to a "hold" condition exerting such maximum force or to a relatively loose grip designated "limb." However, at the outset the valve 130 is adjusted to "hold" thereby gripping the tree trunk at its base with maximum force as above mentioned. Thereupon the operator starts the power saw motor 68 by actuating the saw motor control valve 129. Thereafter the saw 28 is caused to saw through the trunk of the tree near its base and beneath the master jaws 22 by actuating the saw control valve 128 which angularly moves the saw 28 from right to left, as viewed in Fig. 11. While the saw 28 is so cutting through the trunk of the tree, the C-frame 28 and hence the master jaws 22 and the trunk of the tree 27 are lifted for the purpose of preventing a binding of the saw by the weight of the tree as it is cut through, such lifting being effected by manually adjusting the C-frame control valve 127 to the "lift" position. When the saw has passed through the trunk of the tree, the trunk will be slightly elevated under the influence of such C-frame control valve 127 whereupon the saw is caused immediately to return to its initial position by a manipulation of the saw control valve 128.

After the tree has been thus sawed through, it is prepared for felling. However, the tree may now be transferred while in an upright position to a more suitable location for felling if this is desired, the tree, of course, being movable by means of the mobile tractor to such new position. The tree, when in its selected position for felling, is lowered or angularly shifted from an upright to a horizontal position by manually adjusting the master jaw vertical-horizontal valve 131, the feed jaws 31 at the time being open and positioned at the righthand limit of their motion (Figs. 3 and 11) for receiving the trunk. When the tree trunk has been lowered to the horizontal, the feed jaw control valve 133 is adjusted to a closed position, the tree trunk then being grasped by both sets of jaws.

Next the delimbing operation takes place as follows: The master jaws 22 are adjusted to "hold" by means of the valve 130, that is, they are adjusted to grip the tree trunk with maximum available force, and the feed jaws are adjusted to "limb" by adjusting the valve 133, thereby causing the feed jaws to grip the tree trunk with relatively less force suitable for sliding along the tree trunk for debarking and delimbing purposes. The feed jaws 31 then are shifted axially of the tree trunk by adjustment of the carriage control valve 132, the carriage being moved through its full limit of motion from the right to the left. The serrations or cutters 84 on the inner surface of the feed jaws perform a debarking function and to some extent a delimbing function. Thereafter the feed jaw carriage 32 is returned from its lefthand position (Fig. 3) to its extreme righthand position, the cutters 124 performing a delimbing function enroute. On such return stroke of the carriage 32, the serrations 124 act on both the curved front and rear faces or sides of the tree trunk.

At this point in the operation, the feed jaw carriage 32 is in its righthand position and the grip of the feed jaws is tightened from the "limb" intensity to "hold" intensity by suitable adjustment of the valve 133. Then the grip of the master jaws 22 is lessened in intensity from "hold" to "limb" and the tree trunk is urged axially to the right, as viewed in Figs. 2 and 9, this being accomplished by adjustment of the carriage valve 132. The sliding of the tree through the set of master jaws 22 acts to debark and to "delimb" the tree trunk by means of the inner cutters or serrations 34 and the side serrations or cutters 123, these elements acting upon the upper and lower curved sides or faces of the trunk.

The angular shifting of the master jaws 22 from their upright gripping to their horizontal gripping position, as aforementioned, angularly shifts the saw 28 by an equal amount until it is in the position shown in Fig. 9 adapted to saw in a substantially vertical plane. The saw 28 at this point can be angularly shifted up and down by means of the saw control valve 128 to saw off selected lengths of the tree trunk, the tree trunk being fed to the saw by axially shifting the feed jaws to the right (Fig. 2) while gripping the tree trunk tightly, the grip of the master jaws 22 concurrently being loosened sufficiently so as to permit such feeding of the trunk to the saw.

Such limbing, feeding and cutting operation continues until the tree is reduced to the smallest size acceptable, for example, to a paper mill.

The disposal of the top portion of the tree can be accomplished by the operator turning the main jaws with the small tree top therein to the upright position whereupon such top can be dropped by opening the master jaws, the top falling to the ground in the path of the tractor whereupon it can be trampled under the treads of the machine and thus pressed into the ground and gotten out of the way.

In the description of operation above set forth it was stated that the feed jaws 31 at the time of felling the tree were positioned at the right hand limit of their motion as viewed from the position of the operator of the vehicle, the same being true as viewed in Figs. 3 and 11. Such latter position of the pair of feed jaws is referred to as the "extended" position, whereas such jaws when at the left hand limit of their motion as is shown in solid lines in Fig. 3 is referred to as the "retracted" position. In one form of the operation of the apparatus the feed jaws are preferably initially positioned in such retracted position as shown in Fig. 3 in solid lines, the felling of the tree being effected by an angular shifting thereof in a clockwise direction as viewed from the position of the operator of the vehicle. The principal force of the impact of the falling tree under these conditions is absorbed by the earth, the butt end of the trunk, of course, being under the control of the master jaws. It is understood that the feed jaws 31 are opened to receive the trunk of the tree as it is so felled. After such felling of the tree, the delimbing of the tree trunk is commenced by the following sequence of operations:

The master jaws 22 are adjusted by means of valve 130 to the "hold" position of maximum intensity of grip, the feed jaws 31 by means of the adjustment of valve 133 are adjusted to a relatively loose grip and then the feed jaw carriage 32 is moved to the right (Fig. 3) by means of the power cylinders 98, 99, by manually controlling the valve 132. The motion of the carriage 32, of course, is arrested at its right hand limit (Fig. 3) and the intensity of the gripping forces of the jaws is reversed, that is, the feed jaws 31 are adjusted to their maximum gripping force and the grip of the master jaws is loosened by the control means above described, whereupon the carriage 32 is moved by said power cylinders 98, 99, back to its retracted from its extended position. The action of the side cutters 124 of the feed jaws or of the side cutters 123 of the master jaws is as above set forth, namely to strip the limbs from the trunk of the tree in the manner above described.

Referring now to Fig. 11, there is shown a valve control means 136 which is operatively connected to the following valves:

(a) 128—Saw control valve;
(b) 130—Master jaw valve;
(c) 132—Feed jaw carriage valve; and
(d) 133—Feed jaw open and close valve.

Such valve control means 136 may be in a form suitable for the purpose of governing the sequence of operations of the above listed four valves automatically to the end that the operator of the apparatus is relieved of the task of manually controlling same in the manner described in detail above. The duration of operation of each of the four valves above listed can be controlled by any suitable means. For example, switch means 137 may be positioned adjacent to the master jaws 22 at the end of the path of movement of the feed jaw carriage 32, such that the switch means are actuated by such carriage reaching its retracted or left hand position, the actuation of such switch means initiating the following sequence of events via an operative interconnection with means 136:

The tightening of the grip of the master jaws 22, the loosening of the grip of the feed jaws 32, and the initiation of the rightward motion of the carriage 32. Analogous switch means 138 may be positioned at the end of the path of the said rightward motion of the feed jaw carriage 32 for reversing the sequence of events, namely, for loosening the grip of the master jaws 22, tightening the grip of the feed jaws 31 and starting the leftward motion of such carriage 32. The switch means 137 and 138 may be suitably connected to the valve control means 136 to accomplish the above purposes.

The switch means 137 also can be operatively connected to the saw control valve 128 for urging the saw through the tree trunk after a selected length thereof has been forced through the master jaws 22. Thus, an automatic delimbing and sawing action is attained.

If desired the saw motor control valve 129 may be actuated in response to angular motion of the saw control arm 67 in such a manner that the hydraulic motor 68 is energized in response to clockwise angular motion of such arm, from the initial or retracted position. Alternatively the saw motor 68 may be continuously actuated.

There is thus provided a novel apparatus for rapidly cutting down the trees, delimbing and sawing the trunk thereof into selected lengths. By virtue of the control of the tree trunk which is maintained at all times during the operation thereof, a speed of cutting down a tree, delimbing and sawing same into lengths can be attained which has not been heretofore approached. Thus the rapidity with which a given stand of timber can be reduced to pulpwood lengths is vastly increased by the present invention.

What is claimed is:

1. In a tree cutter apparatus, means for gripping an upright tree at its base, means for sawing through the trunk of a tree below said gripping means when the tree is so gripped by said gripping means, means for angularly shifting such gripping means while still gripping the tree to fell the tree by swinging same angularly from an upright position downwardly to a horizontal position, clamping means for additionally gripping the tree trunk which has been so felled to a horizontal position, and means for effecting relative movement between said gripping means and clamping means for advancing the tree trunk longitudinally of itself.

2. Apparatus in accordance with claim 1, wherein said sawing means are angularly shifted in response to the angular shifting of said gripping means thereby positioning said sawing means for cutting the tree trunk into selected lengths responsive to such longitudinal advance of the tree.

3. In a tree cutter apparatus, primary gripping means for gripping the trunk of a tree, means for exerting a lifting force upon said primary gripping means, saw means for cutting through the trunk of a tree so gripped and subjected to lifting force by said primary gripping means, said saw means being positioned for effecting a cut below said primary gripping means through the trunk of a tree so gripped in a substantially horizontal plane, secondary gripping means for receiving and additionally gripping the trunk of a tree felled after being sawed through by said saw means, means for angularly shifting the position of said primary gripping means to shift the tree to the horizontal and also the position of such saw means for cutting in a substantially vertical plane, means for moving said secondary gripping means relative to said saw means for advancing the tree trunk in selected lengths to said saw means when said primary gripping means is released.

4. In a tree cutter apparatus, master jaws for clamping the base of an upright tree trunk, a saw for cutting through in a substantially horizontal plane below said jaws a tree trunk so clamped, means for angularly shifting the master jaws to swing the severed tree trunk from such upright to a substantially horizontal position while maintaining control of such angular movement, secondary jaw means for receiving and additionally gripping the tree trunk so angularly shifted, means for mounting said jaw means for relative movement to advance the tree trunk longitudinally of itself relative to a selected cutting location, and means for controlling the forces with which such jaws clamp the substantially horizontal tree trunk, one such jaw being controllable thus to grip the tree trunk with relatively less force than the other for the purpose of effecting such advance.

5. In apparatus of the class described, the combination with a vehicle of: master jaw means for gripping the trunk of a tree, saw means mounted for movement upon said vehicle and positioned for sawing through a tree trunk beneath said master jaw means, means for mounting said master jaw means for angular movement about a substantially horizontal axis which is substantially perpendicular to the trunk of a tree held thereby, such tree thus being angularly shiftable from a substantially vertical to a horizontal position; power means for controlling said mounting means for the master jaw means, secondary jaw means mounted upon said vehicle for receiving the trunk of a tree in response to angular shifting of the severed trunk of the latter to a substantially horizontal position, said jaw means having serrations upon the surfaces thereof which grip the tree trunk, means for mounting said two sets of jaw means for relative movement, power means for effecting such relative movement, means for selectively controlling the force with which said jaw means grip a tree trunk therein, one of such jaw means thus being controllable to grip the tree trunk tightly and the other relatively less tightly whereby relative movement of said jaw means effects a scraping of the tree trunk.

6. Apparatus in accordance with claim 5, characterized in that surfaces of at least one of said two sets of jaw means other than the surfaces mounting said serrations, mount cutting means for delimbing the trunk of a tree moved by said jaw means.

7. In apparatus of the class described, a pair of master jaws, power means for opening and closing such jaws, means for mounting said pair of master jaws for angular movement about a substantially horizontal axis, power means for controlling the angular position of said mounting means to shift angularly a severed tree trunk held by said pair of master jaws in a controlled manner from a substantially vertical to a substantially horizontal position thereby felling the tree, a power saw mounted for movement beneath said pair of master jaws for severing an upright tree trunk held thereby, power lifting means operatively connected to said pair of master jaws for lifting same during the cutting of a tree trunk gripped thereby, a pair of feed jaws positioned for receiving a tree trunk felled by said apparatus, power means for opening and closing said feed jaws, means for mounting said two pairs of jaws for movement relative to one another, power means for effecting such relative movement, said power saw being connected to said mounting means for the pair of master jaws for shifting angularly therewith, the relative movement of the two pairs of jaws, one of said jaws gripping the tree trunk tightly and the other relatively loosely, thus shifting axially the tree trunk resting therein relative to said power saw.

8. Apparatus in accordance with claim 7, characterized in that serrations are provided upon the surfaces of said two pairs of jaws which grip the tree trunk, bark and limbs of the tree trunk thus being removable in response to tightly gripping a tree trunk by one pair of such jaws and relatively loosely gripping same by the other pair and actuating the power means for effecting relative movement between said pairs of jaws.

9. In a tree cutting apparatus, the combination comprising: a vehicle, a pair of master jaws mounted upon said vehicle and positioned for gripping a trunk of a tree, power means for opening and closing said pair of master jaws, control means for said power means, lifting means mounted upon said vehicle and connected to said pair of master jaws for lifting same or lowering same, said lifting means having control means and designed for exerting a lifting force upon a tree trunk grasped by the pair of master jaws during the cutting thereof, a power saw also mounted upon said vehicle, power means for moving said power saw relative to said pair of master jaws for cutting through the trunk of a tree, the power saw being positioned for so cutting a tree trunk below said pair of master jaws, means for mounting said pair of master jaws for angular movement about a substantially horizontal axis, power means for controlling the angular movement of said mounting means, a tree trunk grasped by the pair of master jaws thus being angularly shiftable and fellable from an upright to a substantially horizontal position in response to the action of said power means for said master jaw mounting means, control means for the last-mentioned power means, a pair of feed jaws, means for mounting said feed jaws upon said vehicle, feed jaw power means operatively connected thereto for opening and closing same, means for effecting relative movement between said two pairs of jaws, said feed jaws being positioned for receiving the trunk of a tree in response to the felling of same while held in said master jaws, means for mounting said power saw for angularly shifting same in response to angular movement of the mounting means for said pair of master jaws, said power saw thus being shiftable into a position for cutting the tree trunk into sections of selected length after such trunk has been so felled, means for mounting said two pairs of jaws for movement relative to one another, the tree trunk thus being axially shiftable past the power saw in response to such relative movement, one of said pairs of jaws gripping the tree trunk tightly, the other one relatively loosely.

10. In a tree cutting apparatus, the combination comprising: a vehicle, a pair of master jaws mounted upon said vehicle and positioned for gripping a trunk of a tree, power means for opening and closing said pair of master jaws, control means for said power means, lifting means mounted upon said vehicle and connected to said pair of master jaws for lifting same or lowering same, said lifting means having control means and designed for exerting a lifting force upon a tree trunk grasped by the pair of master jaws during the cutting thereof, a power saw also mounted upon said vehicle, power means for moving said power saw relative to said pair of master jaws for cutting through the trunk of a tree, the power saw being positioned for so cutting a tree trunk below said pair of master jaws, means for mounting said pair of master jaws for angular movement about a substantially horizontal axis, power means for controlling the angular movement of said mounting means, a tree trunk grasped by the pair of master jaws thus being angularly shiftable and fellable from a vertical position to a substantially horizontal one in response to the action of said power means for said master jaw mounting means, control means for the last-mentioned power means, a pair of feed jaws, means for mounting said feed jaws upon said vehicle, feed jaw power means operatively connected thereto for opening and closing same, means for effecting relative movement between said two pairs of jaws, said feed jaws being positioned for receiving the trunk of a tree in response to the felling of same by said power saw and angularly shiftable pair of master jaws, means for mounting said two pairs of jaws for movement relative to one another, the tree trunk thus being axially shiftable past the power saw in response to such relative movement, one of said pairs of jaws gripping the tree trunk tightly, the other one relatively loosely.

11. In apparatus of the class described, a vehicle, a pair of master jaws mounted upon said vehicle, power means for opening and closing such jaws, the latter being designed for gripping the trunk of a tree while being cut through, means for mounting said pair of master jaws for angular movement about a substantially horizontal axis thereby angularly to shift a tree trunk through substantially 90° after same has been cut through thereby to fell the tree, power means for controlling such angular movement of said pair of master jaws, a power saw also mounted upon said vehicle and positioned for cutting through the trunk of a tree gripped by said pair of master jaws, said power saw and mounting means for the pair of master jaws being interconnected for angularly shifting same together about such horizontal axis, said saw thus being positioned for cutting through the trunk of a tree in a substantially horizontal plane, said master jaws then being in a position for gripping an upstanding tree trunk, the saw being shiftable to a position for cutting in a substantially vertical plane through a felled tree trunk in response to angular shifting of the pair of master jaws to fell the tree to a substantially horizontal position, a pair of feed jaws also mounted upon said vehicle and positioned for receiving the trunk of a tree in response to the aforementioned angular shifting of the pair of master jaws from a substantially vertical to a substantially horizontal position, means for mounting said two pairs of jaws for movement relative to one another, power means for opening and closing said feed jaws upon a felled tree trunk, and means for adjusting the power means for said two pairs of jaws for controlling the intensity of the clamping action thereof upon the tree trunk whereby one set of jaws is tightly clampable upon the tree trunk and the other pair relatively loosely clamped, the tree trunk thereupon being slidable through the pair of jaws relatively loosely clamping same in response to relative movement of the two pairs of jaws, said jaws having serrations formed thereupon for scraping the tree trunk in response to such sliding thereof through a pair of jaws which is so relatively loosely clamped thereon, the power saw and tree trunk thus being relatively movable past one another by selected increments of the length of the tree trunk in response to relative movement of said pairs of jaws, one pair tightly clamping the tree trunk, the other loosely gripping it.

12. In apparatus of the class described, a vehicle, a pair of master jaws mounted upon said vehicle, power means for opening and closing such jaws, the latter being designed for gripping the trunk of a tree while being cut through, means for mounting said pair of master jaws for angular movement about a substantially horizontal axis perpendicular to such trunk thereby angularly to shift a tree trunk through about 90° after same has been cut through thereby to fell the tree, power means for controlling such angular movement of said pair of master jaws, a power saw also mounted upon said vehicle and positioned for cutting through the trunk of a tree gripped by said pair of master jaws, mounting means for said power saw which are angularly shiftable, said saw thus being positionable for cutting through the trunk of a tree in a substantially horizontal plane, said master jaws then being in a position for gripping an upstanding tree trunk, the saw being shiftable to a position for cutting in a substantially vertical plane through a tree trunk when the pair of master jaws have been angularly shifted to fell the tree to a substantially horizontal position, a pair of feed jaws also mounted upon said vehicle and positioned for receiving the trunk of a tree in response to the aforementioned angular shifting of the pair of master jaws from a substantially vertical to a substantially horizontal position, means for mounting said two pairs of jaws for movement relative to one another, power means for opening and closing said feed jaws upon a felled tree trunk, and means for adjusting the power means for said two pairs of jaws for controlling the intensity of the clamping action thereof upon a tree.

13. In apparatus of the class described, a frame member, a pair of master jaws mounted upon said frame member for grasping the trunk of a tree for holding same in a vertical position during a cutting through of such trunk, means for exerting a lifting force upon such master jaws, saw means also mounted upon said frame member for sawing through such trunk below such master jaws, power means operatively connected to such saw means for moving same relative to the gripped tree trunk thereby to cause the saw means to saw through same, said lifting force means being concurrently effective to exert such lifting force upon the tree trunk to prevent binding of the saw means while so sawing, means for mounting said master jaws for angular movement for shifting the tree trunk gripped thereby from an upstanding to a felled position, power means for controlling the angular position of such mounting means for so angularly shifting a tree while maintaining control thereof during the felling of same, feed jaws also mounted upon said frame member and positioned when open for receiving the trunk of a tree gripped by said master jaws and so shifted to a felled position, said master jaws and feed jaws having serrations formed upon the inner surfaces thereof, means for effecting relative movement between said two sets of jaws, power means for actuating said master jaws and separate power means for actuating said feed jaws, control means for said jaw power means for governing each separately and selectively to clamp the trunk of the tree in grips of selected differing intensity, one of said sets of jaws thus being adjustable to a tight grip and the other to a looser grip, said saw means being angularly shiftable from the aforementioned initial position for cutting through the trunk of the tree along a substantially horizontal plane to a second position for cutting through the trunk of the tree when the latter is felled and held by said jaws and hence positioned for cutting therethrough in a substantially vertical plane, the trunk of the tree being movable past the saw means by selected lengths in response to firmly gripping the tree trunk by one of said sets of jaws and relatively loosely gripping the trunk by the other set and effecting such relative movement between said sets of jaws by the aforementioned power means.

14. In combination, a pair of master jaws for grasping the trunk of an upright tree for holding same during a sawing through of such trunk, power means operatively connected to such saw means for moving same relative to the gripped tree trunk thereby to cause the saw means to saw through same, means for mounting said master jaws for angular movement for angularly shifting the severed tree trunk gripped thereby from such upright to a felled and substantially horizontal position, power means for controlling the angular position of such master jaw mounting means for so angularly shifting a tree while maintaining control thereof during the felling of same, a pair of feed jaws positioned when open for receiving the trunk of a tree gripped by said master jaws and so angularly shifted to a felled position, means for effecting relative movement between said two sets of jaws, power means for actuating said master jaws and separate power means for actuating said feed jaws, control means for said jaw power means for governing each separately, selectively to control the intensities of the grips of said two pairs of jaw means, one of said sets of jaws thus being adjustable to a tight grip while the other is adjustable to a looser grip, said saw means being angularly shiftable from the aforementioned initial position for cutting through the trunk of the tree along a substantially horizontal plane to a position for cutting through the trunk of the tree when the latter is felled and held by said two pairs of jaws and hence for cutting therethrough in a substantially vertical plane, the trunk of the tree being movable past the saw means by selected lengths in response to firmly gripping the tree trunk by one of said sets of jaws and relatively loosely gripping same by the other set and effecting relative movement between said sets of jaws by the aforementioned power means.

15. In apparatus for severing a tree and angularly shifting same from a substantially vertical to a substantially horizontal position in a controlled manner, thereafter advancing selected lengths of the felled tree into a position for sawing off same, the combination comprising: a pair of primary jaws for grasping the trunk of a tree, power means for opening and closing such pair of primary jaws, the latter being conformed for grasping the trunk of the tree over a selected portion of the length thereof for the purpose of providing an adequate gripping of such trunk to prevent same from falling after the trunk has been severed beneath said primary jaws, saw means mounted for movement relative to said jaws, power means for effecting such relative movement of said saw to cut through the trunk of a tree when grasped by said primary jaws, means for mounting said primary jaws for angular movement about a substantially horizontal axis, the trunk of an upright tree grasped by such primary jaws thus being angularly shiftable from such upright to a substantially horizontal position, power means operatively connected to said primary jaw mounting means for effecting such angular movement, a pair of secondary jaws mounted to receive the trunk of the tree in response to such angular shifting of same into a substantially horizontal position, power means for opening and closing said pair of secondary jaws, means for mounting said two pairs of jaws for relative movement toward and away from one another, and power means for effecting such relative movement.

References Cited in the file of this patent

UNITED STATES PATENTS

| | | |
|---|---|---|
| Re. 23,895 | Winget | Nov. 9, 1954 |
| 1,399,274 | Radimak | Dec. 6, 1921 |
| 2,378,554 | Irwin | June 19, 1945 |
| 2,540,004 | McFall | Jan. 30, 1951 |
| 2,583,971 | Shuff | Jan. 29, 1952 |
| 2,707,008 | Bannister | Apr. 26, 1955 |
| 2,748,813 | Ford | June 5, 1956 |
| 2,749,707 | Slomer | June 12, 1956 |